(12) United States Patent
Hyckenberg et al.

(10) Patent No.: US 11,321,065 B2
(45) Date of Patent: May 3, 2022

(54) METHOD AND A SYSTEM FOR INSTALLATION OF AN INSTRUMENT

(71) Applicant: Cytiva Sweden AB, Uppsala (SE)

(72) Inventors: Key Hyckenberg, Uppsala (SE); Kjell Karlsson, Uppsala (SE); Par Haggblad, Uppsala (SE); Niklas Engblom, Uppsala (SE)

(73) Assignee: CYTIVA SWEDEN AB, Uppsala (SE)

( * ) Notice: Subject to any disclaimer, the term of this patent is extended or adjusted under 35 U.S.C. 154(b) by 0 days.

(21) Appl. No.: 16/486,546

(22) PCT Filed: Feb. 22, 2018

(86) PCT No.: PCT/EP2018/054449
§ 371 (c)(1),
(2) Date: Aug. 16, 2019

(87) PCT Pub. No.: WO2018/154026
PCT Pub. Date: Aug. 30, 2018

(65) Prior Publication Data
US 2020/0326920 A1    Oct. 15, 2020

(30) Foreign Application Priority Data

Feb. 23, 2017    (GB) .................................... 1702933

(51) Int. Cl.
*G06F 9/44*    (2018.01)
*G06F 9/445*   (2018.01)
(Continued)

(52) U.S. Cl.
CPC .................. *G06F 8/61* (2013.01); *G06F 8/65* (2013.01); *G06F 9/4411* (2013.01)

(58) Field of Classification Search
CPC ............. G06F 8/61; G06F 8/65; G06F 9/4411
See application file for complete search history.

(56) References Cited

U.S. PATENT DOCUMENTS

| 8,726,298 B1* | 5/2014 | Desai | G10H 7/002 719/321 |
|---|---|---|---|
| 2003/0154425 A1 | 8/2003 | Kim | |

(Continued)

OTHER PUBLICATIONS

Ingmar Kuhl, Towards Common Concepts of Remote Services, 2010, pp. 1-8. https://ieeexplore.ieee.org/stamp/stamp.jsp?tp=&arnumber=5641161 (Year: 2010).*

(Continued)

*Primary Examiner* — Mongbao Nguyen
(74) *Attorney, Agent, or Firm* — Eversheds Sutherland (US) LLP

(57) ABSTRACT

Disclosed is a method for automatic installation and setting up of an instrument (1), comprising the steps of: connecting (S1) the instrument (1) to a service software system (15) in a network (19) via a first communication interface (6); sending (S3) identification information (5) of the instrument (1) from the instrument to the service software system (15) via the first communication interface (6); recognizing (S5) in the service software system (15) at least one characteristic of the instrument (1) by analyzing the identification information (5); based on said at least one characteristic or identification information, creating (S7) by the service software system (15) dedicated high level control software (25) comprising parts of the control software needed for the instrument; based on said at least one characteristic or identification information, sending (S9) to the instrument (1) from the service software system (15) software to enable a second communication interface (16), and low level control software components needed for local control of the instrument, installing (S11) and configuring in the instrument the low level control software components received from the service software system; starting (S13) a built-in control software (9) in the instrument; using the (S15) the built-in control software in the instrument to access the high level (Continued)

control software dedicated for the instrument via the first, or a second communication interface (16), said built-in control software using the low level control software to monitor and control the instrument.

17 Claims, 2 Drawing Sheets

(51) Int. Cl.
*G06F 9/455* (2018.01)
*G06F 8/61* (2018.01)
*G06F 8/65* (2018.01)
*G06F 9/4401* (2018.01)

(56) References Cited

U.S. PATENT DOCUMENTS

| | | | |
|---|---|---|---|
| 2004/0010734 A1 | 1/2004 | Gherciouiu et al. | |
| 2004/0034478 A1* | 2/2004 | Yung | G05B 15/02 702/19 |
| 2005/0209871 A1 | 9/2005 | Han et al. | |
| 2006/0005167 A1 | 1/2006 | Wade | |
| 2006/0271329 A1* | 11/2006 | Edson | G06F 9/4411 702/122 |
| 2011/0004745 A1* | 1/2011 | Kubota | G06F 9/4418 713/1 |
| 2012/0005465 A1* | 1/2012 | Attanasio | G06F 8/61 713/1 |
| 2012/0124569 A1 | 5/2012 | Park et al. | |
| 2013/0145046 A1* | 6/2013 | Rivkin | G06F 9/541 709/246 |
| 2013/0311986 A1* | 11/2013 | Arrouye | H04L 67/06 717/175 |
| 2014/0095858 A1 | 4/2014 | Cerri et al. | |
| 2014/0173082 A1* | 6/2014 | Shin | G16H 40/67 709/223 |
| 2014/0331218 A1* | 11/2014 | Kryzer | G06F 8/65 717/170 |
| 2014/0358469 A1 | 12/2014 | Graf et al. | |
| 2015/0347114 A1* | 12/2015 | Yoon | H04L 12/2832 235/375 |
| 2016/0103669 A1* | 4/2016 | Gamage | H04L 67/34 717/177 |
| 2016/0196128 A1* | 7/2016 | Wang | G06F 8/65 717/173 |
| 2016/0274883 A1 | 9/2016 | Iids | |
| 2017/0032101 A1* | 2/2017 | Skoda | G06F 19/3456 |
| 2017/0060567 A1* | 3/2017 | Kim | H04L 41/082 |
| 2017/0107476 A1* | 4/2017 | Polley | G01N 30/86 |
| 2017/0160995 A1* | 6/2017 | Fukasawa | G06F 3/1204 |
| 2017/0168809 A1* | 6/2017 | Zander | G06F 8/65 |
| 2018/0101377 A1* | 4/2018 | Wingate, Jr. | B64D 43/02 |
| 2018/0129515 A1* | 5/2018 | Kumar | G06F 9/44505 |
| 2019/0220268 A1* | 7/2019 | Suzuki | H04L 63/02 |
| 2020/0185091 A1* | 6/2020 | Davis | G06F 16/24578 |

OTHER PUBLICATIONS

Qiong Sun, A Framework for Remotely Monitoring and Maintaining Control Software over the Internet, 2013, pp. 1-5. https://ieeexplore.ieee.org/stamp/stamp.jsp?tp=&arnumber=6615274 (Year: 2013).*

PCT International Search Report and Written Opinion for PCT Application No. PCT/EP2018/054449 dated Apr. 24, 2018 (16 pages).

Great Britain Search Report for GB Application No. 1702933.1 dated Aug. 1, 2017 (5 pages).

* cited by examiner

METHOD AND A SYSTEM FOR INSTALLATION OF AN INSTRUMENT

CROSS REFERENCE TO RELATED APPLICATIONS

This application claims the priority benefit of PCT/EP2018/054449 filed on Feb. 22, 2018, which claims priority benefit of Great Britain Application No. 1702933.1 filed on Feb. 23, 2017, the entire contents of which are hereby incorporated by reference herein.

TECHNICAL FIELD OF THE INVENTION

The present invention relates to a method and a system for automatic installation and setting up of an instrument.

RELATED ART

Instruments which are requiring specific software and external computer devices for control and monitoring are often difficult and time-consuming to install and configure. Chromatography, filter systems and bioreactors are examples of such instruments. A specific control software needs to be installed in a computer which needs to be connected to the instrument and dedicated for this instrument. Furthermore data bases and/or e-license systems are often required.

The process for installation and setting up of these kinds of instruments require time and knowledge from the user. Furthermore the infrastructure needed such as a computer connected to the instrument require space in the lab.

SUMMARY

An object of the present invention is to provide an improved method and system for installation and setting up of an instrument.

This is achieved by a method, an instrument, a service software system, a system and a computer program product according to the independent claims.

In one aspect of the invention a method for automatic installation and setting up of an instrument is provided. Said method comprises the steps of:
connecting the instrument a service software system in a network via a first communication interface;
sending identification information of the instrument from the instrument to the service software system via the first communication interface;
recognizing in the service software system at least one characteristic of the instrument by analyzing the identification information;
creating by the service software system high level control software comprising parts of the control software needed for this specific instrument;
sending to the instrument from the service software system a second communication interface and low level control software components needed for this specific instrument, said low level control software components comprising parts of the control software needed for this specific instrument;
installing and configuring in the instrument the low level control software components received from the service software system;
starting a built in control software in the instrument;
connecting the built-in control software in the instrument to the high level control software dedicated for this instrument in the network via the second communication interface received in the instrument from the service software system, said built-in control software using the low level control software to monitor and control the instrument.

In another aspect of the invention an instrument to be controlled and monitored by a user is provided, wherein said instrument comprises:
identification information specific for at least one characteristic of the instrument;
a built in control software; and
an instrument processing device configured for performing the steps of:
connecting the instrument to a service software system in a network via a first communication interface;
sending said identification information of the instrument to the service software system via the first communication interface;
receiving from the service software system a second communication interface and low level control software components needed for this specific instrument, said low level control software components comprising parts of the control software needed for this specific instrument;
installing and configuring in the instrument the low level control software components received from the service software system;
starting the built in control software in the instrument; and
connecting the built-in control software in the instrument to high level control software comprising parts of the control software needed for this specific instrument in the network via the second communication interface received in the instrument from the service software system, said built-in control software using the low level control software to monitor and control the instrument.

In still another aspect of the invention a service software system is provided in a network comprising at least one processing device configured for performing the steps of:
receiving identification information of an instrument from the instrument via a first communication interface;
recognizing at least one characteristic of the instrument by analyzing the identification information;
creating high level control software comprising parts of the control software needed for this specific instrument;
sending to the instrument from the service software system a second communication interface and low level control software components comprising parts of the control software needed for this specific instrument.

In still another aspect of the invention a system is provided enabling automatic installation and setting up of an instrument comprised in the system. Said system comprises:
an instrument to be controlled and monitored by a user as described above;
a service software system as described above; and
a client software, through which a user can control and monitor the instrument.

In still another aspect of the invention a computer program product is provided comprising instructions which, when executed on at least one processing device in a service software system in a network, cause the processing device to:
receiving identification information of an instrument from the instrument via a first communication interface;
recognizing at least one characteristic of the instrument by analyzing the identification information;

creating high level control software comprising parts of the control software needed for this specific instrument;

sending to the instrument from the service software system a second communication interface, low level control software components comprising parts of the control software needed for this specific instrument and possibly configuration settings needed for this specific instrument.

Hereby a method and a system for automatic installation and setting up of an instrument is provided. The user does not need to spend time on the installation and the user does not need to be educated for the installation process. With this method and system no system computer is needed. No specific computer needs to be dedicated to the instrument but instead the user can connect to a pre-installed high level control software and/or the service software system in the network for controlling and monitoring the instrument via a web browser from any wanted device, such as a mobile telephone or a lap top. Furthermore, in the system according to the invention there is no need for each user to update software. All updates are performed centrally in the service software system. Furthermore, in this system data bases will always be located close to the data base clients which will improve performance.

Preferred features of embodiments are described in the dependent claims.

DETAILED DESCRIPTION OF EMBODIMENTS

Figure 1:
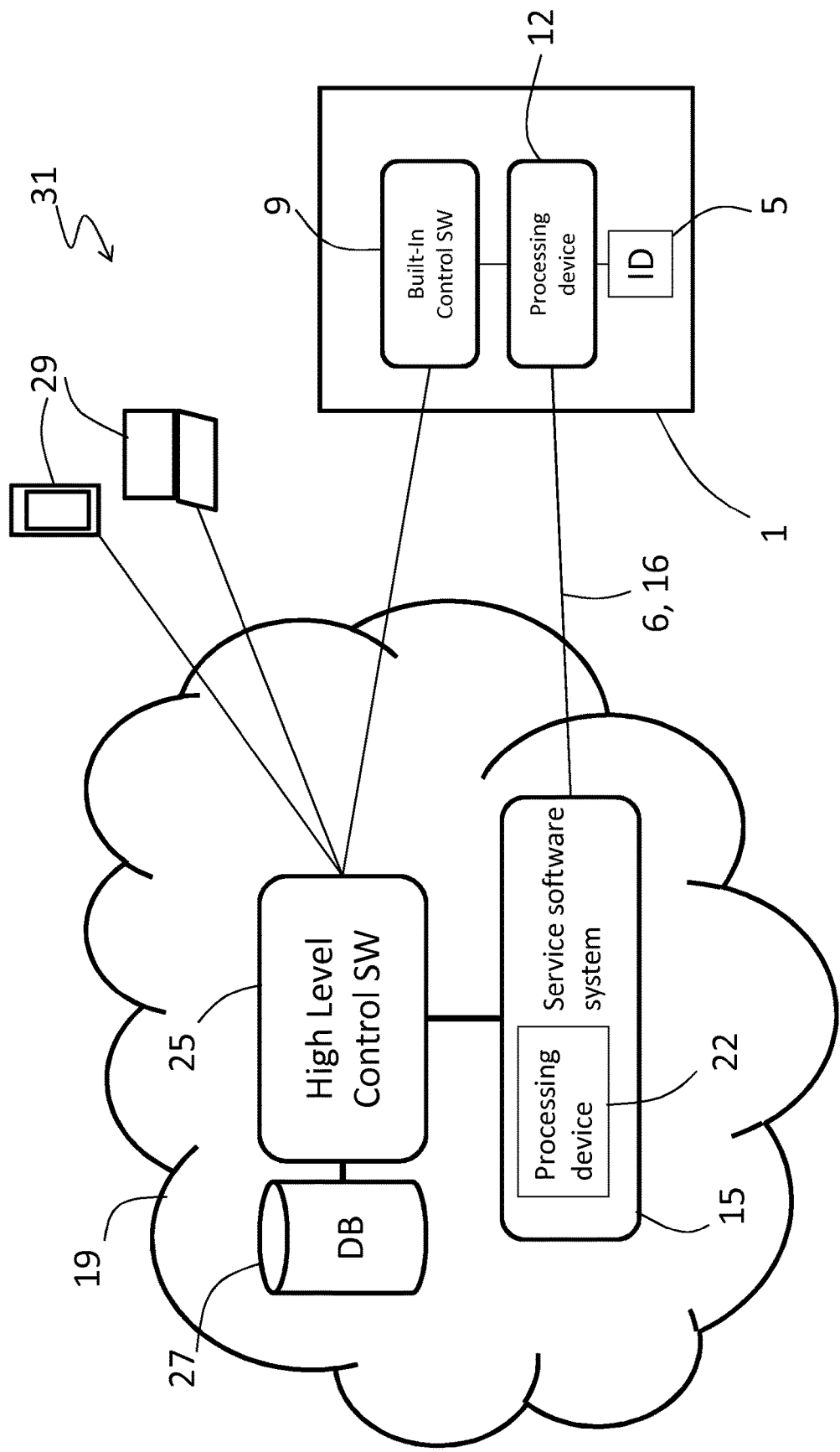
FIG. 1 shows schematically a system according to one embodiment of the invention enabling automatic installation, setting up and configuration of an instrument comprised in the system.
Figure 2:
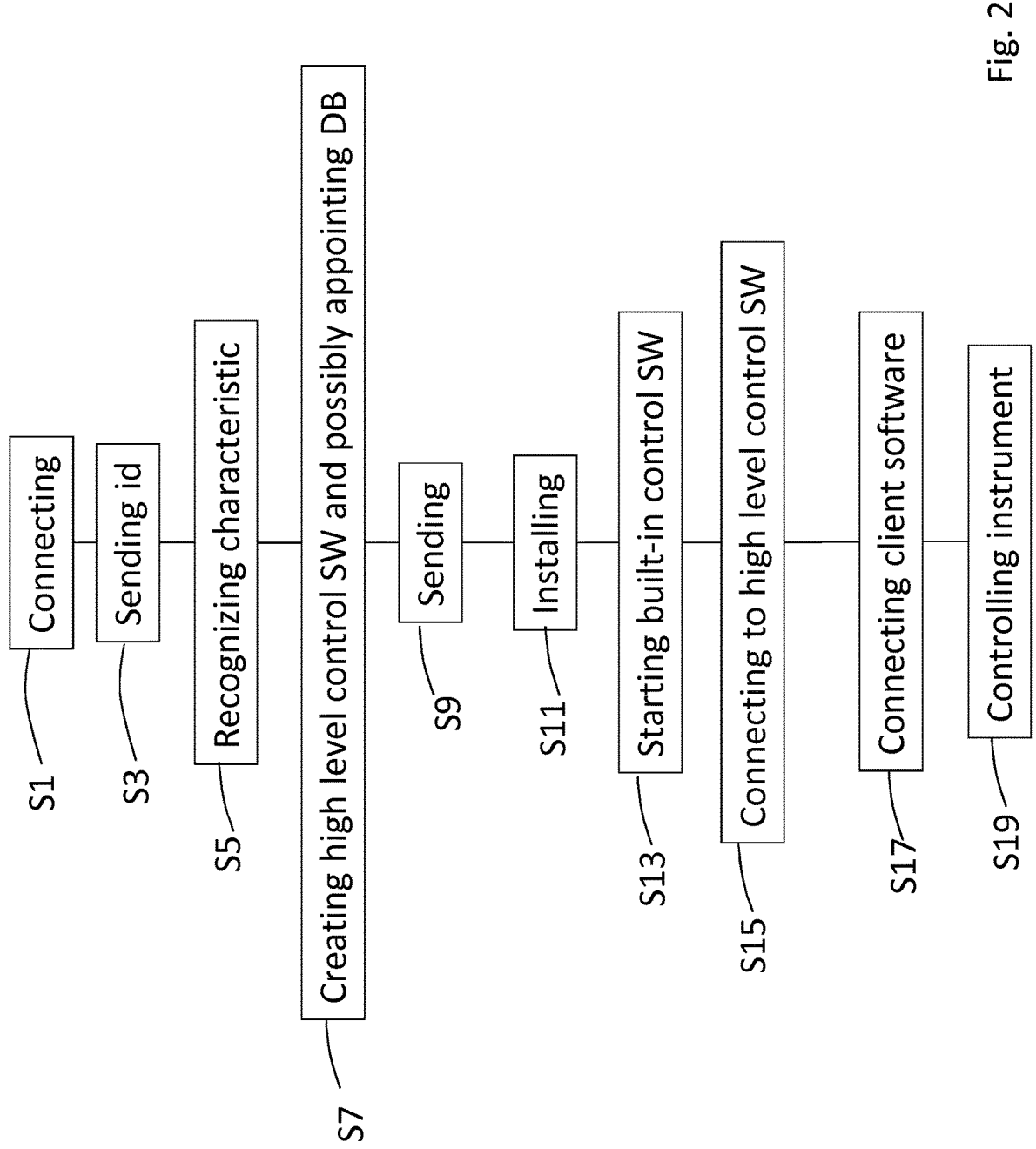
FIG. 2 is a flow chart of a method according to one embodiment of the invention.

A method and a system 31 for automatic installation and setting up of an instrument 1 is provided according to the invention. FIG. 1 shows schematically the system 31 and FIG. 2 is a flow chart of the method. Both Figures are referred to in the description below. The instrument 1 is an instrument requiring software installed in one or more computer(s) that allows data storage, control and monitoring of the instrument. The instrument 1 can in one embodiment for example be a chromatography system, a filter system or a bioreactor.

The method according to the invention comprises the steps of:

S1: Connecting the instrument 1 to a service software system 15 in a network 19 via a first communication interface 6. The service software system 15 comprises hardware and software and is provided in a network 19, which network also the instrument 1 can be connected to. This could be either a public network such as for example Internet or a local network. A user can control and monitor the instrument via the service software system 15. In one embodiment of the invention the step of connecting S1 the instrument to the service software system 15 in the network 19 is performed automatically when a user turns the instrument 1 on whereby an address to the service software system 15 is pre-programmed in a connect software of the instrument 1.

S3: Sending identification information ID of the instrument 1 from the instrument 1 to the service software system 15 via the first communication interface 6.

S5: Recognizing in the service software system 15 at least one characteristic of the instrument 1 by analyzing the identification information ID. The characteristic of the instrument which can be recognized by the service software system by analyzing the identification information can for example be type of instrument and/or capabilities of the instrument.

S7: Creating by the service software system 15 dedicated high level control software 25 needed for this specific instrument 1, where high level software means the software created remotely at the service centre 15. The high level control software 25 comprises some parts of the software needed for monitoring and control of the instrument. The creating S7 of high level control software 25 can comprise configuring of predefined components into an integrated software solution. Possibly this step of creating S7 high level control software 25 also comprises appointing by the service software system 15 data bases 27 in the network 19 needed for this specific instrument 1 and providing data from said data bases 27 to the high level control software and low level control software, where low level software is software destined to be operated at the instrument 1 level.

S9: Sending to the instrument 1 from the service software system 15 via a second communication interface 16, which can be the same interface as the first interface 6, the dedicated low level control software components needed for this specific instrument 1 and possibly also sending configuration settings needed for this specific instrument 1. The low level control software comprises additional parts of control software needed for monitoring and control of the instrument. This low level control software is pre-stored in the service software system. Based on the instrument characteristic recognized for this specific instrument a predefined set of low level control software is provided to the instrument from the service software system. The second communication interface 16 can in one embodiment of the invention use the same physical connection as the first communication interface 6.

S11: Installing and configuring in the instrument 1 the low level control software components received from the service software system 15.

S13: Starting a built in, control software 9 in the instrument 1 which is preconfigured software stored in memory such as ROM, such as EPROM.

S15: Connecting or linking the built-in control software 9 in the instrument 1 to the high level control software 25 dedicated for this instrument 1 in the network 19 via the second communication interface 16 received in the instrument 1 from the service software system 15. Said built-in control software 9 uses the low level control software to monitor and control the instrument 1. During operation the high level and low level software, as well as the built-in software can be in communication via the, or one of the interfaces.

The method steps described above are performed in processing devices 12, 22 in the instrument 1, in the service software system 15 and possibly also in the network 19.

In one embodiment of the invention the method comprises the further steps:

S17: A user connecting a client software 29, such as a web browser, to the high level control software 25 and/or the service software system 15 in the network. The user can use any kind of connectable client device such as a lap top or a mobile telephone.

S19: Controlling and monitoring the instrument 1 through the client software 29 by the user.

The method according to one embodiment of the invention comprises further a central updating of the high and low level control software in the system by letting the service software system 15 update high and low level control software remotely. This will remove the task of keeping the software up-to-date from the end-user. The software will then always be the latest, most secure and updated version available.

In one embodiment of the invention the method further comprises the step of providing dedicated high level control software 25 and possibly dedicated data from data bases 27 for this specific instrument 1 into an installation package and make it available for download for local control and monitoring of the instrument 1. Hereby there is an option for users that do not want to connect through a central network to utilize the automated setup method and after that download a copy of the setup to a local network and connect through that. The user will still get a quick installation and setup and can still have all data and control locally.

In one embodiment of the invention the method also comprises subscription based software licensing allowing customers to pay for software on a need-to-use basis. All software is available but the user would license only the actual usage.

In one embodiment of the invention the method also comprises subscription based monitoring for service purposes and/or remote enabled trouble shooting. The method and system according to the invention enables remote monitoring and remote trouble shooting which was not possible with previous methods and systems which allows for quicker customer support, less travel and more accurate customer information.

According to the invention an instrument 1 to be controlled and monitored by a user is provided. The instrument can be an instrument requiring software installed in one or more computer(s) that allows data storage, control and monitoring of the instrument such as for example a chromatography system, a filter system or a bioreactor. Said instrument 1 comprises identification information 5 specific for at least one characteristic of the instrument. The characteristic of the instrument could be for example type of instrument and/or capabilities of the instrument as discussed above. The instrument 1 comprises further a built in control software 9 that is responsible for communicating with the high level control software, configuring low level control software and controlling the instrument by using the low level control software. The instrument 1 comprises further an instrument processing device 12 connected to the built in control software 9 and configured for performing the steps of:

connecting the instrument 1 to a service software system 15 in a network 19 via a first communication interface 6;

sending said identification information 5 of the instrument 1 to the service software system (15) via the first communication interface 6;

receiving from the service software system 15 via the first, or a second communication interface 16, low level control software components needed for this specific instrument and possibly also configuration settings needed for this specific instrument;

installing and configuring in the instrument 1 the low level control software components received from the service software system 15;

starting the built in control software 9 in the instrument 1; and connecting S15 the built-in control software in the instrument to the high level control software dedicated for this instrument in the network via the second communication interface received in the instrument from the service software system, said built-in control software using the low level control software to monitor and control the instrument.

In one embodiment of the invention the instrument processing device 12 is configured for connecting the instrument 1 to the service software system 15 in the network 19 automatically when a user powers the instrument 1 whereby an address to the service software system 15 is pre-programmed in a connect software of the instrument 1.

In one embodiment of the invention the instrument processing device 12 is configured for receiving software updates for built in control software and low level control software from the service software system.

Further according to the invention, a service software system 15 is provided in a network 19 comprising at least one processing device 22 configured for performing the steps of:

receiving identification information 5 of an instrument from the instrument 1 via a first communication interface 6;

recognizing at least one characteristic of the instrument as described above by analyzing the identification information 5;

creating high level control software 25 needed for this specific instrument 1;

sending to the instrument 1 from the service software system 15 a second communication 16 and low level control software components needed for this specific instrument and possibly also configuration settings needed for this specific instrument.

In one embodiment of the invention said processing device 22 is configured for creating high level control software 25 by configuring predefined components into an integrated software solution. And in one embodiment of the invention said processing device 22 further is configured for appointing data bases 27 in the network needed for this specific instrument 1 and providing data from said data bases to the high and low level control software.

In one embodiment of the invention said processing device 22 further is configured for providing dedicated high level control software 25 and possibly data from dedicated data bases 27 for this specific instrument 1 into an installation package and make it available for download for local control and monitoring of the instrument.

Furthermore according to the invention, a system 31 enabling automatic installation and setting up of an instrument 1 comprised in the system is provided, wherein said system 31 comprises:

an instrument 1 to be controlled and monitored by a user as described above;

a service software system 15 as described above; and a client software 29, through which a user can control and monitor the instrument 1.

The client software 29 can for example be a web browser. And the user can connect through any client device as describe above.

In one embodiment of the invention the system 31 further comprises data bases, service software and instrument related software in the network including infrastructure and hardware to execute the software and communication between the different software.

Furthermore, a computer program product is provided according to the invention. Said computer program product comprises instructions which, when executed on at least one processing device 22 in a service software system 15 in a network 19, cause the processing device 22 to:
- receiving identification information 5 of an instrument from the instrument 1 via a first communication interface 6;
- recognizing at least one characteristic of the instrument by analyzing the identification information;
- creating high level control software 25 needed for this specific instrument;
- sending to the instrument 1 from the service software system 15 a second communication interface 16 and low level control software components needed for this specific instrument and possibly also configuration settings needed for this specific instrument.

The invention claimed is:

1. A method for automatic installation and setting up of an instrument executed by a hardware processing device, the method comprising:
- connecting the instrument to a service software system in a network via a first communication interface, wherein the instrument is a chromatography system, a filter system or a bioreactor;
- sending identification information of the instrument from the instrument to the service software system via the first communication interface;
- recognizing in the service software system at least one characteristic of the instrument by analyzing the identification information;
- based on said identification information, remotely creating by the service software system customized high level control software comprising parts of the control software needed for the instrument, wherein creating the customized high level control software comprises configuring predefined software components into an integrated software solution;
- determining one or more databases comprising data to be used with the customized high level control software;
- providing access to the data in the one or more databases to the customized high level control software;
- based on said identification information, sending to the instrument from the service software system a second communication interface, and low level control software components needed for local control of the instrument, installing and configuring in the instrument the low level control software components received from the service software system;
- providing access to the data in the one or more databases to the low level control software components;
- starting a built-in control software in the instrument;
- using the built-in control software in the instrument to access the high level control software that is customized for the instrument via the first, or a second communication interface, said built-in control software using the low level control software components to monitor and control the instrument; and
- central updating of the high level control software and low level control software components in the service software system by letting the service software system update the high level control software and low level control software components remotely.

2. The method according to claim 1, wherein said method steps are performed in the hardware processing devices in the instrument, in the service software system and optionally also in the network.

3. The method according to claim 1, wherein the step of sending to the instrument from the service software system further comprises sending configuration settings needed for the instrument.

4. The method according to claim 1, further comprising the steps:
- a user connecting client software to the high level control software and/or the service software system in the network; and
- controlling and monitoring the instrument through the client software by the user.

5. The method according to claim 1, wherein the instrument is an instrument requiring software installed in one or more computer(s) that allows data storage, control and monitoring of the instrument.

6. The method according to claim 1, wherein connecting the instrument to a service software system in a network is performed automatically when a user powers the instrument whereby an address to the service software system is pre-programmed in a connect software of the instrument.

7. The method according to claim 1, wherein the at least one characteristic of the instrument recognized in the service software system is type of the instrument and/or capability of the instrument.

8. The method according to claim 1, further comprising the step of providing dedicated high level control software and optionally dedicated data from the data bases for specific instrument into an installation package and make the installation package available for download for the local control and monitoring of the instrument.

9. The method according to claim 1, further comprising one or more of the steps of providing:
- subscription based software licensing;
- subscription based monitoring for service purposes; and/or
- remotely enabled trouble shooting.

10. An instrument to be controlled and monitored by a user, wherein said instrument comprises:
- identification information specific for at least one characteristic of the instrument, wherein the instrument is a chromatography system, a filter system or a bioreactor;
- built in control software; and
- an instrument hardware processing device configured for performing the steps of:
  - connecting the instrument to a service software system in a network via a first communication interface;
  - sending said identification information of the instrument to the service software system via the first communication interface;
  - receiving from the service software system via the first or a second communication interface, low level control software components needed for the specific instrument, said low level control software components comprising parts of the control software needed for the specific instrument, wherein the low level control software components are remotely created by the service software system and are customized for the instrument, and wherein the instrument is permitted to access data in one or more databases comprising data to be used with the low level control software components;
  - installing and configuring in the instrument the low level control software components received from the service software system;

starting the built in control software in the instrument;

connecting the built-in control software in the instrument to high level control software comprising parts of the control software needed for the specific instrument in the network via the first or second communication interface, said built-in control software using the low level control software components to monitor and control the instrument, and wherein the instrument is permitted to access the data in one or more databases comprising data to be used with the high level control software and wherein creating the high level control software comprises configuring predefined software components into an integrated software solution; and central updating of the high level control software and low level control software components by letting the service software system update high level control software and low level control software components remotely.

11. The instrument according to claim 10, wherein the instrument hardware processing device further is configured for receiving from the service software system configuration settings needed for the specific instrument.

12. The instrument according to claim 10, wherein the instrument is an instrument requiring software installed in one or more computer(s) that allows data storage, control and monitoring of the instrument.

13. The instrument according to claim 10, wherein the instrument hardware processing device is configured for connecting the instrument to the service software system in the network automatically when a user turns the instrument on whereby an address to the service software system is pre-programmed in a connect software of the instrument.

14. The instrument according to claim 10, wherein the instrument hardware processing device is configured for receiving software updates from the service software system.

15. A service software system provided in a network comprising at least one hardware processing device configured for performing the steps of:

receiving identification information of an instrument from the instrument via a first communication interface, wherein the instrument is a chromatography system, a filter system or a bioreactor;

recognizing at least one characteristic of the instrument by analyzing the identification information;

based on said identification information, remotely creating customized high level control software comprising parts of the control software needed for the specific instrument, wherein creating the customized high level control software comprises configuring predefined software components into an integrated software solution;

determining one or more databases comprising data to be used with the customized high level control software;

providing access to the data in the one or more databases to the customized high level control software;

sending to the instrument from the service software system a second communication interface and low level control software components comprising parts of the control software needed for the specific instrument;

providing access to the data in the one or more databases to the low level control software components; and central updating of the high level control software and low level control software components by letting the service software system update the high level control software and low level control software components remotely.

16. The service software system according to claim 15, wherein said hardware processing device further is configured for sending configuration settings needed for the specific instrument to the instrument.

17. The service software system according to claim 15, wherein said hardware processing device further is configured for providing dedicated high level control software and possibly data from dedicated data bases for the specific instrument into an installation package and make the installation package available for download for the local control and monitoring of the instrument.

* * * * *